United States Patent
Suzuki et al.

(10) Patent No.: US 6,764,708 B2
(45) Date of Patent: Jul. 20, 2004

(54) PET FOOD AND FEED

(75) Inventors: Yohichi Suzuki, Tokyo (JP); Kazuya Otsuji, Tokyo (JP)

(73) Assignee: KAO Corporation, Tokyo (JP)

( * ) Notice: Subject to any disclaimer, the term of this patent is extended or adjusted under 35 U.S.C. 154(b) by 303 days.

(21) Appl. No.: 10/101,607

(22) Filed: Mar. 21, 2002

(65) Prior Publication Data

US 2003/0068428 A1 Apr. 10, 2003

(30) Foreign Application Priority Data

Mar. 26, 2001 (JP) ........................................ 2001-087242

(51) Int. Cl.[7] .......................... A23D 7/005; A23K 1/16; A23K 1/18
(52) U.S. Cl. ....................................... 426/601; 426/805
(58) Field of Search ................................. 426/601, 805

(56) References Cited

U.S. PATENT DOCUMENTS

| | | | | |
|---|---|---|---|---|
| 3,852,483 A | * | 12/1974 | Oborsh et al. ................ | 426/94 |
| 4,228,195 A | * | 10/1980 | Priegnitz .................... | 426/321 |
| 4,910,039 A | | 3/1990 | Fujita et al. ................ | 426/652 |
| 5,959,131 A | * | 9/1999 | Blaurock et al. ........... | 554/227 |

FOREIGN PATENT DOCUMENTS

| | | | |
|---|---|---|---|
| EP | 0 311 045 | | 4/1989 |
| EP | 1245160 | * | 2/2002 |
| GB | 1 263 389 | | 2/1972 |
| GB | 1263389 | * | 2/1972 |
| JP | 64-2537 | | 1/1989 |
| WO | WO 02/11550 | | 2/2002 |
| WO | WO 02/11552 | | 2/2002 |

OTHER PUBLICATIONS

Derwent Publications, AN 1971–09121S, JP 46–004146, XP–002204664, Jun. 17, 1966.

* cited by examiner

*Primary Examiner*—C. Sayala
(74) *Attorney, Agent, or Firm*—Oblon, Spivak, McClelland, Maier & Neustadt, P.C.

(57) ABSTRACT

Provided is a pet food or feed which contains an oil or fat composition having the following components (A) and (B):

(A) 10 wt. % or more of diglycerides which contain, as constituent fatty acids, 50 wt. % or more of unsaturated $C_{14-24}$ fatty acids and 40 wt. % or less of unsaturated fatty acids having at least 20 carbon atoms and at least 4 carbon-carbon double bonds; and (B) 20 wt. % or less of free fatty acids, wherein a weight ratio of the diglycerides to monoglycerides $\geq 1$. The pet food or feed according to the present invention is reduced in an offensive odor derived from animal proteins, particularly, meats and therefore, does not make pet owners or neighbors feel uncomfortable. It can be prepared without a cumbersome step, only by substituting the part or whole of its oil or fat for a specific oil or fat composition.

25 Claims, No Drawings

PET FOOD AND FEED

BACKGROUND OF THE INVENTION

1. Field of the Invention

The present invention relates to a pet food or feed reduced in odor due to animal proteins, particularly, meats.

2. Discussion of the Background

The pet food market is on the increase owing to a recent pet boom, which is however accompanied with various problems. Changes in housing situations or life style increases the number of pet owners who keep their pets indoors as well as those keeping them outsides. Under such situations, an offensive odor emitted from remains of a pet food tends to make not only pet owners but also neighbors feel uncomfortable.

With regards to a feed, a heightening of its protein content and calorie has been promoted in order to raise its nutritional efficiency. This accelerates emission of an offensive odor due to proteins, particularly animal proteins. Moreover, the greater the breeding scale or breeding density, the more serious the problem of an offensive odor becomes for neighbors.

A number of deodorants or aromatics for eliminating the odor due to pets such as dogs and cats are now put on the market. Cat litters and litter boxes imparted with a deodorizing function are developed to mask the foul odor of feces and urine. Proposed in Japanese Patent Application Laid-Open No. 74455/1988 is a cat food free of unsaturated fatty acids which are causative of the odor of feces and having cyclodextrin incorporated in the food. Although this cat food is capable of controlling the rancid odor derived from fish oil and the odor of feces, it involves problems such as high cost and insufficient effects. Also proposed (in Japanese Patent Application Laid-Open No. 284865/1994) is a pet food having cranberry incorporated therein to mask the odor of feces and urine. This pet food is however accompanied with the drawback that cranberry therein emits an odor. No proposals have been made to overcome the problem of an offensive odor emitted by the remains of a pet food in a feeding station. This problem is common to not only pets but also livestock.

On the other hand, spraying of a commercially available deodorant or aromatic directly to a pet food or feed is not preferred from the viewpoint of safety.

A pet food or feed is comprised mainly of meats, grains, oils and fats, and water.

Meats to be used as a raw material are beef, pork, fish meat, chicken, mutton and lamb. In practice, scraps of these meats, meat-and-bone meal and organs are incorporated in a pet food or feed in the form of meat meal or fish meal. As grains, soybean, wheat, rice and corn have been used, while as oils and fats, either animal ones or vegetable ones have been used.

Pet food or feed is usually produced by grinding, kneading and extrusion of such raw materials and provided in the kibble shapes. It is also provided as a bar of jerky or a biscuit, or sometimes as dry powder. A heating process is required for these manufactures. Also in the manufacture of canned food, it is heated after a canned process.

The foul odor of a pet food or feed is presumed to come from animal proteins, particularly meats, or degraded substances thereof. A preparation process of a pet food or feed includes a heating step, which is conducted for the purpose of sterilization and improvement in shelf life.

Upon heating, sulfur-containing compounds (such as thiazines or thiolanes) or nitrogen containing compounds (such as amines, pyrroles or piazines), each a degraded product of animal proteins, are generated from the meat. These sulfur-containing or nitrogen-containing compounds cause much discomfort so that they are presumed to cause an offensive odor of a pet food or feed.

As a deodorizing method of meats in the processing of livestock meats or fishery products, proposed is addition of an enzyme or citric acid thereto (Japanese Patent Applications Laid-Open Nos. 44066/1979, 44067/1979, 9468/1985 and 15367/1991). It is not suited for pet food or feed production, because addition of an enzyme heightens the cost and makes the preparation step cumbersome, while addition of citric acid reinforces an acid taste, thereby deteriorating palatability.

It is revealed that addition of a medium chain fatty acid diglyceride to a feed is effective for prevention or treatment of protozoan diseases (U.S. Pat. No. 5,462,967 or EP 0519458B), but its effects against an offensive odor are not sufficient. In Japanese Patent Applications Laid-Open Nos. 174342/1989, and 2537/1989, it is described that monoglycerides and diglycerides derived from higher unsaturated fatty acids such as docosahexaenoic acid (DHA) or eicosapentaenoic acid (EPA) bring about effects for promoting fish appetite or attracting fish. Monoglycerides or diglycerides themselves contain large amounts of DHA or EPA, so that it is difficult to say that in the absence of water, they have sufficient effects against an offensive odor. In U.S. Pat. No. 4,228,195, is proposed a preparation process of a pet food by using fatty acid monoglycerides including succinylated monoglyceride, but it does not refer to an odor.

SUMMARY OF THE INVENTION

An object of the present invention is to provide a pet food or feed reduced in an offensive odor due to animal proteins, particularly, meats without a cumbersome step.

The present inventor has found that an oil or fat containing a specific diglyceride markedly reduces an offensive odor derived from animal proteins, particularly meats.

In one aspect of the present invention, there is thus provided a pet food or feed which contains an oil or fat composition comprising the following components (A) and (B):

(A) 10 wt. % or more of diglycerides which contain, as constituent fatty acids, 50 wt. % or more of unsaturated $C_{14-24}$ fatty acids and 40 wt. % or less of unsaturated fatty acids having at least 20 carbon atoms and at least 4 carbon-carbon double bonds; and (B) 20 wt. % or less of free fatty acids, and (E) 0 to 10 wt % of monoglyceride, wherein a weight ratio of the diglycerides to monoglycerides$\geq 1$.

In another aspect of the present invention, there are also provided an offensive odor controlling agent of a pet food or feed which contains the above-described oil or fat composition; and a method for ameliorating the offensive odor of a pet food or feed, which comprises incorporating the above-described oil or fat composition in the pet food or feed. In a further aspect of the present invention, there is also provided a pet food or feed which comprises the following components (C) and (D):

(C) 0.2 to 60 wt. % of animal proteins comprising myosin or actin; and (D) 1 to 30 wt. % of an oil or fat composition comprising 10 wt. % or more of diglycerides which contain, as constituent fatty acids, 50 wt. % or more of unsaturated $C_{14-24}$ fatty acids and 40 wt. % or less of unsaturated fatty acids having at least 20 carbon atoms and at least 4 carbon-carbon double bonds, 20 wt. % or less of free fatty acids, and 0 to 30 wt. % of monoglyceride, wherein a weight ratio of the diglycerides to monoglycerides≧1.

The pet food or feed according to the present invention is reduced in an offensive odor due to animal proteins, particularly, meats and therefore, does not cause discomfort. It can be prepared without any cumbersome step, only by incorporating therein a specific oil or fat composition as the part or whole of its oil or fat component.

DETAILED DESCRIPTION OF THE INVENTION

In the present invention, the term "pet food" means pet food for dogs, cats and the like pets, whereas the term "feed" means feed for animals such as pigs, poultry and fish.

The oil or fat composition to be used in the pet food or feed of the present invention contains 10 wt. % (which will hereinafter be described "%", simply) or more, preferably 15 to 99%, more preferably 30 to 99%, especially 50 to 95%, most preferably 60 to 95% of diglycerides in order to suppress an offensive odor derived particularly from meats.

As constituent fatty acids, the diglycerides contain 50% or more, preferably 70 to 99%, especially 80 to 98% of unsaturated $C_{14-24}$ fatty acids. Such diglycerides have marked effects for suppressing an offensive odor, are readily available and have no problem in handling ease. The amount of constituent fatty acids having less than 14 carbon atoms is preferably 0.5% or less in consideration of effects and palatability. Incorporation of 15 to 90% of α-linolenic acid is particularly preferred for exhibition of physiological effects of ω3 fatty acids. The diglycerides preferably contain, as constituent fatty acids, 40% or less, preferably 20% or less, more preferably 10% or less, more preferably 0 to 5%, especially 0 to 2% of unsaturated fatty acids which have at least 20 carbon atoms such as EPA, DHA or arachidonic acid and have at least 4 carbon-carbon double bonds, from the viewpoints of oxidation stability and odor control. The remaining constituent fatty acids of the diglycerides are preferably saturated $C_{14-24}$ fatty acids.

It is known that diglycerides are poorly accumulated as a body fat (U.S. Pat. No. 6,004,611). A pet food or feed having some or all of its oil/fat content replaced with diglycerides can be expected to have such effect.

In consideration of palatability, a weight ratio of diglycerides to monoglycerides contained in the oil or fat composition satisfies the following equation: diglycerides (DG)/ monoglycerides (MG)≧1, preferably DG/MG=2 to 1000, more preferably DG/MG=10 to 500, especially DG/MG=40 to 300.

The diglycerides as described above may be prepared by conventional methods known to those of ordinary skill in the art without undue experimentation, are available, for example, by ester exchange reaction of glycerin with an oil or fat selected from oils or fats having, as constituent fatty acids, unsaturated $C_{14-24}$ fatty acids (ex. safflower oil, olive oil, cotton seed oil, corn oil, rapeseed oil, soybean oil, palm oil, sunflower oil, linseed oil, sesame oil; lard, tallow, fish oil or milk fat, or fractionated, randomized, hydrogenated or ester exchanged oil thereof) in the presence of a hydroxide of an alkali metal or an alkaline earth metal; or by esterifying reaction of glycerin with a fatty acid mixture having a high content of unsaturated fatty acids derived from the above-described oils or fats. The above-described oils or fats may be used in combination. Excess monoglycerides formed by the reaction can be removed by separating means such as molecular distillation or chromatography. Although these reactions may be conducted by the chemical reaction using an alkali catalyst as described above, reaction effected under mild conditions through an enzyme such as 1-, 3-position-selective lipase or the like is preferred for oxidation stability and preference.

The content of free fatty acids in the oil or fat composition to be used in the pet food or feed of the present invention is 20% or less, preferably 10% or less, more preferably 0 to 5%, especially 0 to 2%, most preferably 0 to 1% in consideration of its tendency to emit an offensive odor from the oil or fat composition and palatability.

As another component in the oil or fat composition, triglycerides (TG) can be mentioned. Examples of them include animal and vegetable oils or fats. Triglycerides preferably have, as constituent fatty acids, saturated or unsaturated $C_{14-24}$ fatty acids. It is more preferred that they contain 50 to 100%, especially 70 to 100%, most preferably 80 to 100% of unsaturated $C_{14-24}$ fatty acids.

Addition of an antioxidant to the oil or fat composition is preferred. Examples of the antioxidant include tocopherol, vitamin C, vitamin C fatty acid esters, phospholipids, polyphenols, BHT, BHA, TBHQ, and natural antioxidant components. To 100 parts by weight of the oil or fat composition, the antioxidant is added preferably in an amount of 0.01 to 0.5 part by weight, more preferably 0.02 to 0.3 part by weight.

The pet food or feed of the present invention is prepared by mixing the oil or fat composition (Component (D)) and an animal protein containing myosin or actin (Component (C)).

The animal protein containing myosin or actin, which protein is Component (C) of the pet food or feed of the present invention, is a protein contained in livestock meats such as beef, pork, chicken, mutton and lamb, and fish meat and serves as an essential component for the growth of pets or poultry. Example of the meat containing animal protein include livestock or animal meats such as beef, pork, mutton, lamb, rabbit meat, and kangaroo meat and byproducts or processed products thereof; meats of birds such as chicken, turkey, quail and ostrich, and byproducts or processed products thereof; products obtained by rendering of the above-exemplified raw meats such as meat balls, meat bone meals and chicken meals; and fish meats such as bluefin tuna, bonito, Japanese horse mackerel, sardine, common scallop, turban shell and fish meal. The pet food or feed contains 0.2 to 60%, preferably 1 to 30%, of Component (C).

The protein as defined herein is that determined from a nitrogen content by the Kjeldahl nitrogen determination method (5.5 to 6.4, the Standard Tables of Food Composition in Japan), whereas the animal protein is found from the amount of myosin or actin quantified by densitometry based on comparison with a sample of known concentration by SDS-electrophoresis (SDS-PAGE). Animal proteins in meats contain 25 to 35% of myosin and 12 to 13% of actin. The pet food or feed of the present invention contains 0.05 to 21.0% of myosin and 0.02 to 7.8% of actin.

The pet food or feed of the present invention contains 0.2 to 60% of Component (C) and 1 to 30% of Component (D), preferably 1 to 30% of Component (C) and 1 to 20% of Component (D). Component (D) may be substituted for the part or whole of the existing oil content in the pet food or feed.

A weight ratio of the animal protein to the diglycerides in the pet food or feed of the present invention preferably satisfies the following equation: animal proteins/ diglycerides=100/0.1 to 1/150, more preferably 100/1 to 1/30, especially 10/1 to 1/4, when offensive odor suppressing effects and nutritional balance are taken into consideration.

The pet food or feed of the present invention may further contain phytosterol. To the feed, addition of phytosterol in an amount of 0.1% or more, especially 0.5% or more is preferred from the standpoint of imparting better cholesterol lowering effects. The upper limit of the phytosterol content may fall within a range of 0.1 to 30%. Phytosterols usable here include free compounds such as α-sitosterol, β-sitosterol, stigmasterol, campesterol, α-sitostanol, β-sitostanol, stigmastanol, campestanol and cycloartenol, and esters thereof such as fatty acid esters, ferulic acid esters, and cinnamic acid esters.

The base of the pet food or feed of the present invention is prepared by mixing Components (C) and (D), and phytosterol to be added as needed with vegetable proteins, grains, brans, starch cakes, saccharides, vegetables, vitamins and minerals. Examples of the vegetable proteins include soybean protein, those of the grains include wheat, barley, rye, milo, and corn, those of the brans include rice bran and wheat bran, and those of the starch cakes include soybean cake. The total content of the vegetable proteins, grains, brans and starch cakes is preferably 5 to 95% of the pet food or feed. Examples of the saccharides include oligosaccharide, sugar, sucrose and molasses and their content is preferably 5 to 80%. As the vegetables, vegetable extracts are usable and the vegetable content is preferably 1 to 30%. Examples of the vitamins include A, $B_1$, $B_2$, D, E, niacin, pantothenic acid and carotene and their content is preferably 0.05 to 10%. Examples of the minerals include calcium, phosphorus, sodium, potassium and iron and their content is preferably 0.05 to 10%. In addition, the pet food or feed of the present invention may contain ordinarily employed additives such as gelling agent, shape retainer, pH regulator, seasoning, antiseptic and nutrition supplement. During preparation, heating while purging with an inert gas such as nitrogen or deaerating is effective and is therefore preferred for controlling oxidation of the oil or fat composition (D).

Having generally described this invention, a further understanding can be obtained by reference to certain specific examples which are provided herein for purposes of illustration only and are not intended to be limiting unless otherwise specified.

EXAMPLES

Example 1

An offensive odor controlling agent of the feed according to the present invention was prepared to have the following composition.

Oil or Fat Composition 1 (Invention Product)

By using Lipozyme IM (product of Novo Nordisk A/S), 650 parts by weight of rapeseed oil fatty acid and 107 parts by weight of glycerin were esterified at 40° C. for 5 hours at 0.07 hPa, followed by the removal of the lipase by filtration. The resulting reaction mixture was then molecularly distilled at 235° C.: The residue was washed with water and then-deodorized at 235° C. for 1 hours, whereby Oil or Fat Composition 1 was obtained.

Oil or Fat Composition 2 (Invention Product)

By using Lipozyme IM (product of Novo Nordisk A/S), 650 parts by weight of perilla oil fatty acid and 107 parts by weight of glycerin were esterified at 40° C. for 6 hours at 0.07 hPa, followed by the removal of the lipase by filtration. The resulting reaction mixture was then molecularly distilled at 215° C. The residue was washed with water and then deodorized at 215° C. for 2 hours, whereby Oil or Fat Composition 2 was obtained.

Oil or Fat Composition 3 (Invention Product)

By using Lipozyme IM (product of Novo Nordisk A/S), 650 parts by weight of rapeseed hydrogenated oil (IV=75) and 107 parts by weight of glycerin were esterified at 50° C. for 4 hours at 0.07 hPa, followed by the removal of the lipase by filtration. The resulting reaction mixture was then molecularly distilled at 235° C. The residue was washed with water and then deodorized at 235° C. for 1 hour. The resulting product was mixed with purified rapeseed oil (product of Nisshin Oil Mills, Ltd.) at a weight ratio of 3:7, whereby Oil or Fat Composition 3 was obtained.

Oil or Fat Composition 4 (Comparative Product)

Rapeseed oil (product of Nisshin Oil Mills; Ltd.) was designated as Oil or Fat 4 and used as a comparative product.

The glyceride composition and the diglyceride fatty acid composition of each of these oil or fat compositions were described below.

TABLE 1

Glyceride composition (%)

| Oil or fat composition | 1 | 2 | 3 | 4 |
|---|---|---|---|---|
| Triglycerides | 13.5 | 17.0 | 74.4 | 98.5 |
| Diglycerides | 85.1 | 82.3 | 25.2 | 1.1 |
| Monoglycerides | 1.1 | 0.6 | 0.3 | 0.4 |
| Free fatty acids | 0.3 | 0.1 | 0.1 | 0.0 |

* Each oil was reacted with trimethylsilylation agent (a silylating agent TH, Kanto Chemical Co., Ltd.) and the resulting silylated oils were analyzed by use of GLC equipped with a capillary column (DBTM-l, product of J & W) and hydrogen flame ionization detector.

TABLE 2

Fatty acid composition of diglycerides and triglycerides

| Oil or fat composition | | 1 | 2 | 3 | 4 |
|---|---|---|---|---|---|
| Diglycerides | C16:0 | 3.7 | 5.4 | 3.8 | 3.7 |
| | C18:0 | 1.8 | 3.4 | 12.0 | 1.8 |
| | C18:1 | 57.0 | 18.3 | 78.7 | 60.3 |
| | C20:1 | 1.7 | 0.0 | 2.3 | 2.5 |
| | C22:1 | 1.0 | 0.0 | 0.0 | 1.4 |
| | C18:2 ω6 | 21.9 | 15.2 | 0.2 | 20.5 |
| | C18:3 ω3 | 10.5 | 56.5 | 0.0 | 8.4 |
| Triglycerides | C16:0 | 6.2 | 5.5 | 3.9 | 3.7 |
| | C18:0 | 2.6 | 3.4 | 1.8 | 1.8 |
| | C18:1 | 57.1 | 18.5 | 51.7 | 58.8 |
| | C20:1 | 1.7 | 0.0 | 1.5 | 2.0 |
| | C22:1 | 1.0 | 0.0 | 0.9 | 1.0 |
| | C18:2 ω6 | 21.8 | 15.7 | 21.2 | 21.9 |
| | C18:3 ω3 | 10.4 | 54.8 | 16.6 | 8.4 |

*Triglyceride fraction and diglyceride fraction were collected from each oil by subjecting the oils to column chromatography (Wako gel C-200, product of Wako Pure Chemical Industries, Ltd.), eluting triglycerides from the column with hexane, and then eluting diglycerides from the column with hexane/ether (70:30, v/v). The resulting each fraction was analyzed by GLC according to the method described in "2.4.1.2-1996, Preparation of methyl esters of fatty acids" and "2.4.2.2-1996, Fatty acid composition" of "Standard Analytical Methods for Fats and Oils" (edited by the Japan Oil Chemists' Society).

Example 2

Pet foods for dogs as shown in Table 3 were prepared, respectively, using the agents (oil or fat compositions) for controlling the offensive odor of the feed prepared in Example 1.

TABLE 3

| Composition | Invention product 1 | Invention product 2 | Invention product 3 | Comparative product 1 |
|---|---|---|---|---|
| Corn | 15 | 15 | 15 | 15 |
| Meat meal | 8 | 8 | 8 | 8 |
| Wheat flour | 26 | 26 | 26 | 26 |
| Defatted soybean | 20 | 20 | 20 | 20 |
| fish powder | 16 | 16 | 16 | 16 |
| Beat pulp | 4 | 4 | 4 | 4 |
| Bone meal | 2 | 2 | 2 | 2 |
| Vitamins-minerals | 4 | 4 | 4 | 4 |
| Lard | 3 | 3 | 3 | 3 |
| Oil or fat composition 1 | 2 | — | — | — |
| Oil or fat composition 2 | — | 2 | — | — |
| Oil or fat composition 3 | — | — | 2 | — |
| Oil or fat composition 4 | — | — | — | 2 |
| Animal proteins | 11 | 11 | 11 | 11 |
| Myosin* | 3.3 | 3.3 | 3.3 | 3.3 |
| Actin* | 1.4 | 1.4 | 1.4 | 1.4 |

*Content (%) in the pet food.

Measuring Method:

Myosin and actin were quantified using SDS-PAGE and from these amounts, an animal protein content was determined. Described specifically, samples and a standard sample of known concentration were each subjected to SDS-PAGE. The resulting gel was taken out and dyed with bromophenol blue. The dyed amount was then measured by a densitometry (product of Amersham Pharmacia Biotech). After preparation of a calibration curve, myosin and actin were quantified. Based on these amounts, the animal protein content was calculated.

A panel of 5 experts made an organoleptic evaluation of the odor of each of the pet foods based on the following evaluation criteria.

5: No odor

4: Almost no odor

3: Slight odor but not uncomfortable

2: A little offensive odor

1: An offensive odor

Average scores of the five experts are shown in Table 4. The advantage of the invention can be recognized when an average score is 0.5 or more than that of the comparative product.

An offensive odor of any one of the invention products was reduced compared with that of the comparative product.

TABLE 4

| | Invention product 1 | Invention product 2 | Invention product 3 | Comparative Product 1 |
|---|---|---|---|---|
| 3 Hours after opening of pet food package (allowed to stand at 20° C.) | 3.2 | 3.4 | 3.0 | 2.2 |

Example 3

Pig Feeds as shown in Table 5 were prepared.

TABLE 5

| Composition | Invention product 4 | Invention product 5 | Invention product 6 | Comparative product 2 |
|---|---|---|---|---|
| Corn | 45 | 45 | 45 | 45 |
| Meat meal | 15 | 15 | 15 | 15 |
| Wheat flour | 14 | 14 | 14 | 14 |
| Defatted soybean | 10 | 10 | 10 | 10 |
| Fish meal | 3 | 3 | 3 | 3 |
| Beat pulp | 4 | 4 | 4 | 4 |
| Bone meal | 2 | 2 | 2 | 2 |
| Vitamins-minerals | 3 | 3 | 3 | 3 |
| Oil or fat composition 1 | 4 | — | — | — |
| Oil or fat composition 2 | — | 4 | — | — |
| Oil or fat composition 3 | — | — | 4 | — |
| Oil or fat composition 4 | — | — | — | 4 |
| Animal proteins | 5 | 5 | 5 | 5 |
| Myosin* | 1.4 | 1.4 | 1.4 | 1.4 |
| Actin* | 0.4 | 0.4 | 0.4 | 0.4 |

*Content (%) in the feed.

In a similar manner to Example 2, organoleptic evaluation of the odor was carried out.

TABLE 6

| | Invention product 4 | Invention product 5 | Invention product 6 | Comparative Product 2 |
|---|---|---|---|---|
| 3 Hours after opening of feed package (allowed to stand at 20° C.) | 3.8 | 4.4 | 3.6 | 2.8 |

Any one of the invention products is ameliorated in an offensive odor compared with the comparative product.

Obviously, numerous modifications and variations of the present invention are possible in light of the above teachings. It is therefore to be understood that within the scope of the appended claims, the invention may be practiced otherwise than as specifically described herein.

This application is based on Japanese patent application 2001-87242 filed in the Japanese Patent Office on Mar. 26, 2001 the entire contents of which are hereby incorporated by reference.

What is claimed as new and desired to be secured by Letters Patent of the United States is:

1. A pet food or feed, comprising an oil or fat composition comprising:
   (A) 10 wt. % or more of diglycerides which comprises as constituent fatty acids, 50 wt. % or more of unsaturated $C_{14-24}$ fatty acids and 40 wt. % or less of unsaturated fatty acids having at least 20 carbon atoms and at least 4 carbon-carbon double bonds;
   (B) 20 wt. % or less of free fatty acids, and
   (E) monoglyceride,
   wherein a weight ratio of the diglycerides to monoglycerides≧1.

2. The pet food or feed of claim 1, wherein constituent fatty acids of said diglyceride are comprised of 15 to 90 wt. % of α-linolenic acid.

3. The pet food or feed of claim 1, comprising 15 to 99 wt. % of diglycerides.

4. The pet food or feed of claim 1, comprising 30 to 99 wt. % of diglycerides.

5. The pet food or feed of claim 1, comprising 70 to 99.% of unsaturated $C_{14-24}$ fatty acids.

6. The pet food or feed of claim 1, wherein a weight ratio of the diglycerides to monoglycerides is from 2 to 1,000.

7. The pet food or feed of claim 1, wherein a weight ratio of the diglycerides to monoglycerides is from 10 to 500.

8. The pet food or feed of claim 1, wherein a content of free fatty acids is 10% or less.

9. The pet food or feed of claim 1, wherein a content of free fatty acids is 0 to 5%.

10. The pet food or feed of claim 1, further comprising triglycerides.

11. The pet food or feed of claim 10, wherein said triglyceride is comprised of saturated or unsaturated $C_{14-24}$ fatty acids.

12. A pet food or feed, comprising
   (C) 0.2 to 60 wt. % of animal proteins comprising myosin or actin; and
   (D) 1 to 30 wt. % of an oil or fat composition comprising 10 wt. % or more of diglycerides which comprises as constituent fatty acids, 50 wt. % or more of unsaturated $C_{14-24}$ fatty acids and 40 wt. % or less of unsaturated fatty acids having at least 20 carbon atoms and at least 4 carbon-carbon double bonds, 20 wt. % or less of free fatty acids, and monoglyceride,
   wherein a weight ratio of the diglycerides to monoglycerides $\geq 1$.

13. The pet food or feed of claim 12, wherein constituent fatty acids of said diglyceride are comprised of 15 to 90 wt. % of α-linolenic acid.

14. The pet food or feed of claim 12, comprising 15 to 99 wt. % of diglycerides.

15. The pet food or feed of claim 12, comprising 30 to 99 wt. % of diglycerides.

16. The pet food or feed of claim 12, comprising 70 to 99.% of unsaturated $C_{14-24}$ fatty acids.

17. The pet food or feed of claim 12, wherein a weight ratio of the diglycerides to monoglycerides is from 2 to 1,000.

18. The pet food or feed of claim 12, wherein a weight ratio of the diglycerides to monoglycerides is from 10 to 500.

19. The pet food or feed of claim 12, wherein a content of free fatty acids is 10% or less.

20. The pet food or feed of claim 12, wherein a content of free fatty acids is 0 to 5%.

21. The pet food or feed of claim 12, further comprising triglycerides.

22. The pet food or feed of claim 21, wherein said triglyceride is comprised of saturated or unsaturated $C_{14-24}$ fatty acids.

23. The pet food or feed of claim 21, having a weight ratio of animal proteins to diglycerides of 100/0.1 to 1/150.

24. The pet food or feed of claim 21, having a weight ratio of animal proteins to diglycerides of 100/1 to 1/30.

25. The pet food or feed of claim 21, further comprising phytosterol.

* * * * *